3,311,035
METHOD OF MAKING HEAT-RESISTANT MATS
Hubert J. Poskey, Sulphur Springs, and Gerald F. Thomas, Arlington, Tex., assignors to Ling-Temco-Vought, Inc., Dallas, Tex., a corporation of Delaware
No Drawing. Filed Dec. 18, 1964, Ser. No. 419,577
2 Claims. (Cl. 94—22)

This invention pertains to heat-resistant products and particularly to mats of heat resistant products that when exposed to intense heat release an inorganic filler to dissipate heat by decomposition and evaporation.

During take-off and landing of VTOL (vertical take-off and landing) aircraft at a landing area other than at a permanent airfield with concrete runways, dust and debris from the landing area that does not have a prepared surface are scattered by air flow such as to interfere with operation of the aircraft. In addition, when jet engines are used, the landing surface is heated to such an extent that personnel cannot readily work in the vicinity of the aircraft immediately after it has landed and its jet engines have been stopped.

When the product of this invention is utilized to lay a mat at a take-off and landing site, a tenacious surface that cools quickly after exposure to heat is provided. A resinous binder reinforced with glass fiber provides the requisite strength, and a boric acid filler that decomposes and evaporates, thereby absorbing heat, provides necessary surface cooling. Antimony trioxide and boric acid, in conjunction with chlorinated resin, form a glazed or glass-like charred surface that resists erosion.

An object of this invention is to provide a material that can be used shortly after its application to the ground for a mat on which to land a jet VTOL aircraft without danger of flying dust and debris.

Another object is to provide material than can be transported easily and then can be applied sparingly and readily to a surface to protect it and improve its load-carrying properties.

A feature of the product of this invention is its quality of forming a glass-like charred surface that resists erosion from jet blasts and movement of loads over it.

Another feature is the extremely rapid curing of the product after the catalyst is added with no deleterious effects such as cracking or bubbling.

Still another feature is that adherent and rigid characteristics of the product facilitate patching a portion of a landing mat of the product of spraying additional layers of the product on used portions of a mat, including those portions that are mostly charred.

A preferred composition that has been successfully tested consists of the following ingredients according to weight:

| | Percent |
|---|---|
| Chlorinated polyester resin | 56.00 |
| Granular boric acid | 32.00 |
| Antimony trioxide powder | 5.50 |
| Glass fiber | 5.00 |
| Methyl ethyl ketone peroxide (MEKP) (60% solution in dimethyl phthalate) | 1.50 |

The proportions of the ingredients may be varied and still provide a satisfactory mixture with different viscosities and slightly different ablative characteristics. The proportion of boric acid can be varied from 25% to 40%; the antimony trioxide from 3% to 10%; the glass fiber, from 3% to 15%; and the MEKP from 0.3% to 3%. An exemplary chlorinated polyester resin is sold under the trade name Hetron 353 by Hooker Chemical Corporation, Durez Plastics Division, North Tonowanda, N.Y. Hetron 353 is a styrenated, ethylene glycol-chlorendic acid-fumarate type polyester resin containing pyrogenic silica as a thixotropic agent and cobalt naphthenate as an accelerator.

Boric acid particles are dispersed throughout the material. When the composition is set, the particles are firmly encapsulated within the resin to protect the particles from weathering. The setting time may be as short as 10 minutes and the compound can be exposed to intense heat within one-half to four hours after its application. The rapid curing does not have deleterious effects on the product because exothermic heat is absorbed by the filler.

A landing mat for a VTOL can most readily be laid by using sprayers for both the glass fiber and a mixture of the resin, the curing agent or catalyst, and the fillers. The resinous mixture is preferably sprayed upon the glass fiber immediately after it is dispensed upon the ground, so that wind or some other force will not disturb the dispersed fibers. Alternatively, the resinous mixture and the glass fiber can be dispensed concurrently from adjacent dispensers or simultaneously from a single dispenser. Since the composition is tough and operates efficiently to dissipate heat, a layer about ¼-inch thick on the ground is sufficient for a landing mat on rough ground that is to be used several times.

In the fabrication of an exemplary mat, glass fiber is first applied to an area that is to be protected. Either short, chopped fibers can be sprayed evenly upon the ground, or preferably a special dispenser that utilizes air pressure can be used to dispense a continuous filament of glass fiber randomly crisscrossed upon the ground. The catalyst is then added to the mixture of resin and fillers and sprayed immediately upon the fiber. The amount of peroxide catalyst that is required depends upon the temperature at the site; during hot weather, as little as 0.3% is sufficient.

Additional layers of fiber and resin can be added to provide required thickness. Typically, the central portion of a landing pad is thicker than the outer portion, since the central portion must take landing loads while the outer portion serves primarily as a dust cover. A central portion 20 to 25 feet in diameter that is to support an aircraft can be applied at the rate of two to four pounds per square foot. Four or more pounds per square foot may be required to provide a satisfactory mat over the surface of soft soil to support the load of the aircraft. A surrounding dust cover need only be applied at the lower rate of, for example, one pound per square foot. A mat about 60 feet in diameter provides complete dust control for a small aircraft that has downwardly directed jets.

Upon exposure to blasts from jet engines, the surface of the composition of the mat gradually erodes. When first exposed to a jet blast, a thin layer of resin is decomposed to expose particles of boric acid. The exposed boric acid particles evaporate and thereby dissipate heat in the mat, while the particles of boric acid that are positioned deeper within the mat are protected by the insulation of the resin to prevent their evaporation until they are subsequently exposed.

As the intense heat of the jet is continuously applied, the hot surface of resin begins to char. The antimony trioxide effectively reacts with some of the boric acid and the chlorinated resin to form a glazed surface that retards erosion of the charred surface by jet blasts. Since the charred surface is highly emissive, it radiates heat readily; and its glass-like surface prevents erosion of the boric acid particles before absorption of heat by evaporation is fully effective at the surface of the mat where heat absorption is most needed. As intense heat continues to char the surface of the mat, the charred surface gradually recedes to expose additional boric acid particles until an area of the mat is completely charred. The temperature below an area of the mat does not reach a temperature appreciably above the temperature of evaporation of the filler until all the filler of that area has evaporated. If a mat which has been exposed to a jet flame still has some filler retained therein, within about one minute after the flame has been removed, the surface does not feel painfully hot.

When an area of the mat becomes thin because of charring, additional glass fiber and resinous mixture may be sprayed on the thin portion to restore it to its original thickness or to increase its thickness by any desired amount. The charred portion has sufficient strength and the resinous mixture is sufficiently adherent to provide a firm patched area.

In addition to being used for landing mats, the composition can be used to protect a structure of any shape that is normally and repeatedly exposed to sources of high temperature or to protect any structure that may possibly be exposed accidentally. The adherent characteristic of the resin causes the composition to adhere to usual structural materials. The resin composition is reinforced greatly by the small percentage of glass fiber that is included.

The borate heat resistor or subliming particles need not be incorporated as boric acid but may be incorporated as such compounds as sodium borate, potassium borate, etc. Other modifications will be apparent to those skilled in the art and still be within the scope and spirit of the following claims.

We claim:
1. The rapid method of preparing a landing mat for VTOL aircraft comprising the steps of mixing 35–70% by weight of ethylene glycol-chlorendic acid-fumarate type polyester resin with 25–40% by weight of boric acid and 3–10% by weight of antimony trioxide to disperse said boric acid and said antimony trioxide throughout said resin,
dispersing glass fiber on the ground over an area selected for a landing site,
adding a peroxide catalyst to said mixture in an amount required for curing said resin, and
applying said mixture onto said glass fiber immediately after adding said catalyst.

2. The method of preparing a landing mat for VTOL aircraft comprising the steps of
adding 25–40% by weight of boric acid particles and 3–10% by weight of antimony trioxide particles to 35–70% by weight of ethylene glycol-chlorendic acid-fumarate type polyester resin and mixing well to disperse said boric acid and antimony trioxide particles throughout said resin,
dispersing glass fiber on the ground over an area selected for a landing site,
adding a peroxide catalyst to said mixture for curing said resin rapidly,
applying said mixture immediately after adding said catalyst onto said glass fiber at a rate of approximately one pound per square foot to provide a dust cover, and
applying alternately additional layers of glass fiber over the central portion of said area and additional quantities of said mixture immediately after adding said catalyst until at least three pounds per square foot has been applied to provide a heat-resistant surface that is sufficiently firm to support the load of said aircraft.

References Cited by the Examiner
UNITED STATES PATENTS

| | | |
|---|---|---|
| 2,495,306 | 1/1950 | Zurcher. |
| 2,779,701 | 1/1957 | Robitschek et al. _____ 260—40 |
| 2,909,501 | 10/1959 | Robitschek et al. _____ 260—40 |

OTHER REFERENCES

Bjirjsteb: Polyesters and Their Applications; Reinhold Publishing Corp., 1956, pp. 140 and 159.

JACOB L. NACKENOFF, *Primary Examiner.*